United States Patent
Frohlich et al.

(10) Patent No.: US 6,414,278 B1
(45) Date of Patent: Jul. 2, 2002

(54) PIZZA WARMER AND OVEN SYSTEM

(76) Inventors: Sigurd Frohlich; Richard M. Schneider; Abel Olivera, all of 7920 Airway Rd., Suite A-10, San Diego, CA (US) 92154

( * ) Notice: Subject to any disclaimer, the term of this patent is extended or adjusted under 35 U.S.C. 154(b) by 0 days.

(21) Appl. No.: 09/531,721

(22) Filed: Mar. 21, 2000

(51) Int. Cl.[7] .............................. A47J 59/02; A47J 56/24

(52) U.S. Cl. ........................ 219/399; 219/387; 219/428

(58) Field of Search .................................. 219/385–387, 219/395, 399, 428; 165/104.17, 104.21

(56) References Cited

U.S. PATENT DOCUMENTS

| | | | |
|---|---|---|---|
| 2,552,143 A | * 5/1951 | Brock | 219/399 |
| 2,831,098 A | * 4/1958 | Luscher | 219/385 |
| 2,994,760 A | * 8/1961 | Pecoraro et al. | 219/395 |
| 3,126,882 A | * 3/1964 | Hilfiker | 219/385 |
| 3,721,803 A | 3/1973 | Distefano | |
| 3,805,018 A | 4/1974 | Luong et al. | |
| 3,852,570 A | 12/1974 | Tyler | |
| 4,019,022 A | * 4/1977 | Seider et al. | 219/386 |
| 4,134,004 A | 1/1979 | Anderson et al. | |
| 4,149,066 A | 4/1979 | Niibe | |
| 4,198,559 A | 4/1980 | Walter et al. | |
| 4,248,291 A | 2/1981 | Jarmul | |
| 4,316,078 A | * 2/1982 | Mack et al. | 219/386 |
| 4,528,439 A | 7/1985 | Marney, Jr. et al. | |
| 4,580,035 A | * 4/1986 | Luscher | 219/398 |
| 4,672,178 A | 6/1987 | Wada et al. | |
| 4,777,930 A | 10/1988 | Hartz | |
| 4,806,736 A | 2/1989 | Schirico | |
| 4,816,646 A | * 3/1989 | Solomon et al. | 219/387 |
| 4,839,502 A | * 6/1989 | Swanson et al. | 219/399 |
| 4,868,898 A | 9/1989 | Seto | |
| 4,916,290 A | 4/1990 | Hawkins | |
| 4,933,534 A | 6/1990 | Cunningham et al. | |
| 4,979,923 A | 12/1990 | Tanaka | |
| 4,982,722 A | * 1/1991 | Wyatt | 126/400 |
| 5,052,369 A | 10/1991 | Johnson | |
| 5,128,522 A | 7/1992 | Marx et al. | |
| 5,150,707 A | 9/1992 | Anderson | |
| 5,276,310 A | * 1/1994 | Schmidt et al. | 219/386 |
| 5,404,808 A | * 4/1995 | Smith et al. | 219/387 |
| 5,454,471 A | * 10/1995 | Norvell | 126/400 |
| 5,880,434 A | * 3/1999 | Pinnow et al. | 219/386 |
| 5,884,006 A | * 3/1999 | Frohlich et al. | 219/387 |
| 5,892,202 A | 4/1999 | Baldwin et al. | |
| 5,948,301 A | * 9/1999 | Liebermann | 219/395 |
| 5,986,239 A | * 11/1999 | Corrigan, III et al. | 219/385 |
| 6,091,053 A | * 7/2000 | Aonuma | 219/387 |
| 6,118,101 A | * 9/2000 | Choboter | 219/395 |

* cited by examiner

*Primary Examiner*—Joseph Pelham
(74) *Attorney, Agent, or Firm*—Thomas J. Tighe

(57) ABSTRACT

A pizza warmer and oven system in which a plurality of pizza warmers containing a phase change material can be charged to their preferred temperatures by resistance heaters positioned in shelves above and below each warmer in an oven. One embodiment has top shelves biased in close proximity with the warmers. Moving a lever causes the upper shelves to be raised by cams, allowing removal or insertion of warmers. Insertion of warmers into the oven trips switches, starting timing circuits which energize the heater and charging indicator lights. At the end of the timing cycle, indicator lights signal the warmer's charged condition. In another embodiment, the top shelves are gravitationally biased down but are each free to move upward slightly for warmer insertion or removal. Turning on the oven energizes the heaters. A thermostat in the heater circuit turns off the heater at a pre-selected temperature. The warmers have a thermal switch connected to contacts on flats on the sides of the warmer which become part of the lighting circuit when the warmer is installed. When the charging temperature is reached the switch closes, turning on the indicator light. The warmers have handles defined near their perimeters which stay outside of the oven when the warmers are installed in the charging slots, allowing a charged warmer to be safely grasped. Charged warmers can be used as needed to keep pizza hot in an insulated container during delivery to the consumer.

11 Claims, 13 Drawing Sheets

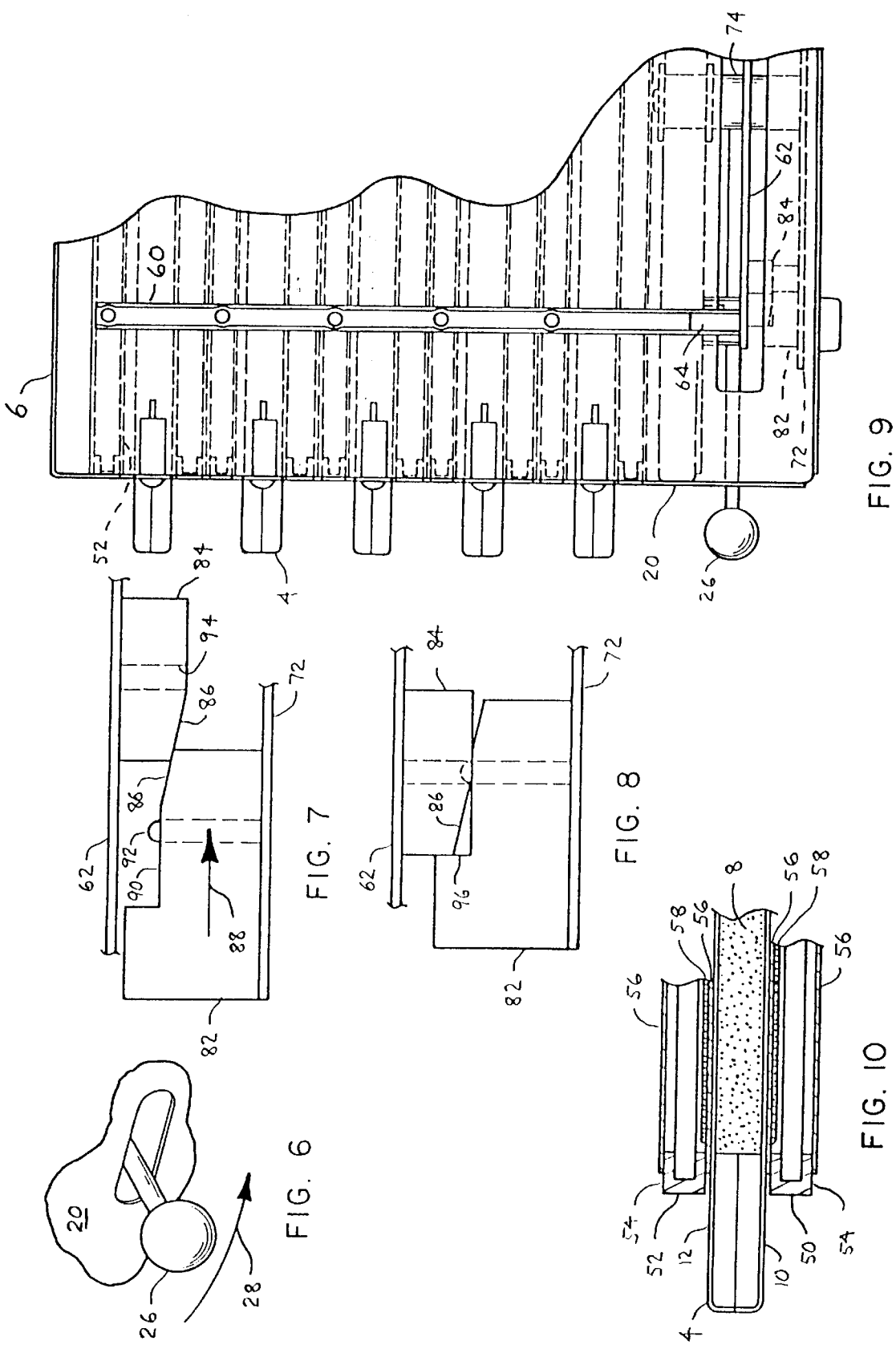

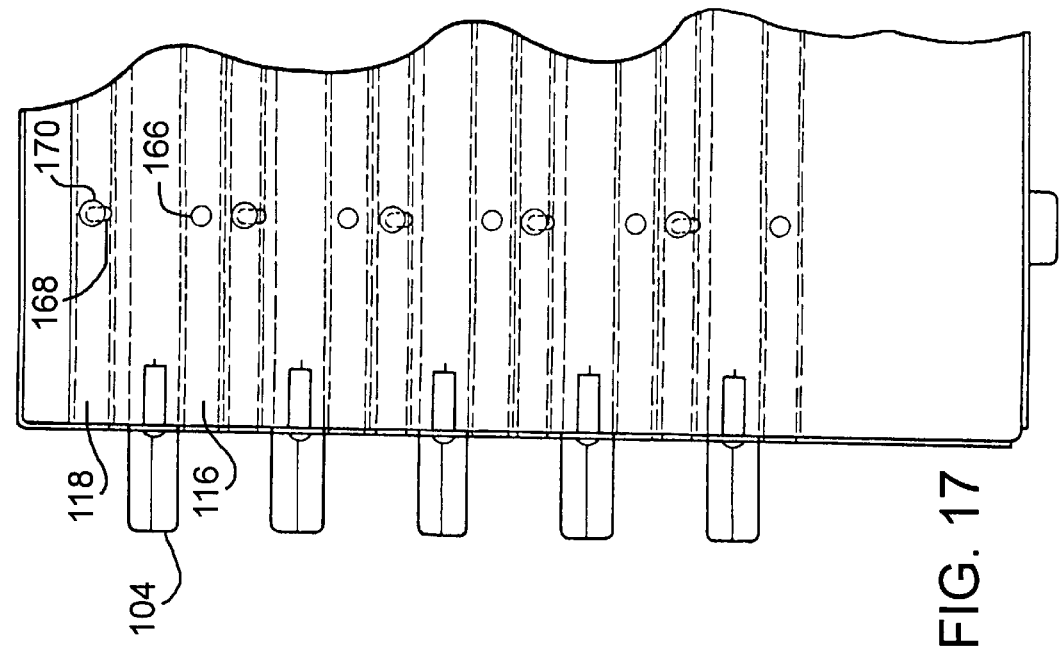
FIG. 17
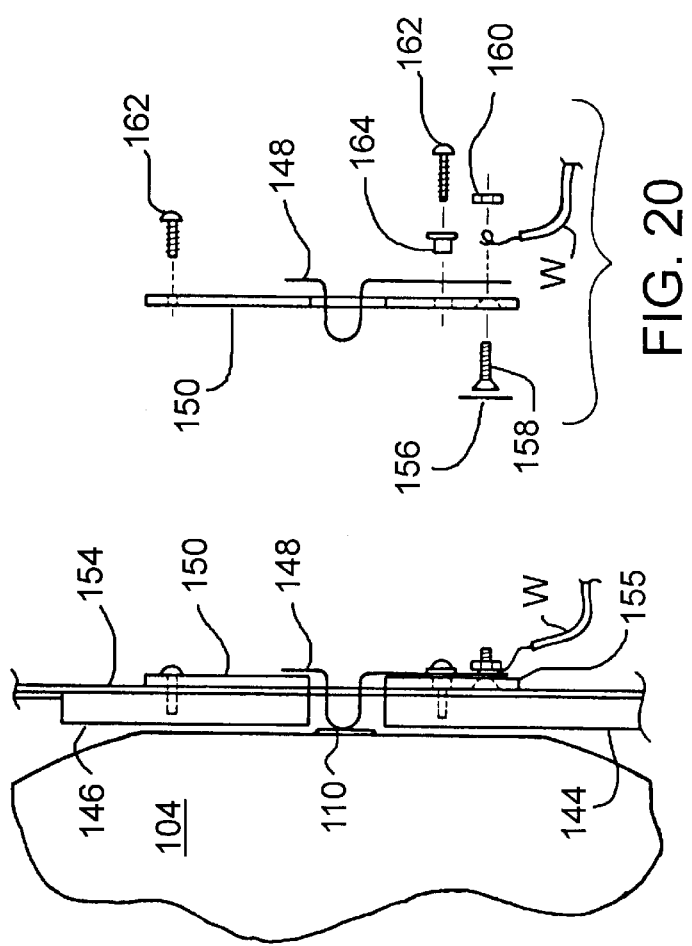
FIG. 20
FIG. 19
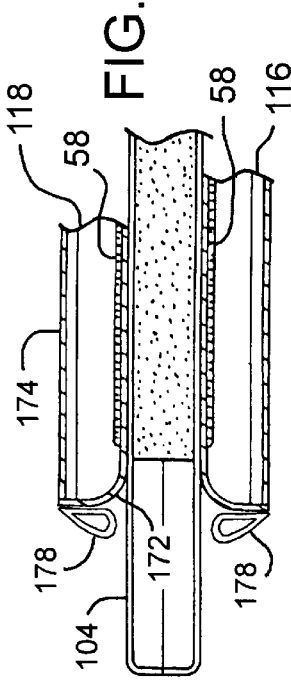
FIG. 18

PIZZA WARMER AND OVEN SYSTEM

BACKGROUND OF THE INVENTION

This invention relates in general to the field of devices and apparatus for keeping food warm and more particularly to devices and apparatus for keeping pizzas and other food items hot until delivered to the consumer.

The prior art encompasses a wide variety of devices and apparatus for reducing the rate at which pizzas cool, allowing them to be delivered before they have cooled to the ambient temperature. Such products are generally inadequate, since the consumer wants pizza to be hot when delivered. There are also devices for keeping pizzas hot until delivered to the consumer, generally containing a phase change material which releases its latent heat of fusion to maintain the temperature of the pizzas. These devices work well but must be charged to their usable temperatures by absorbing their latent heat of fusion. This is done in a variety of ways: by heating in an oven, by heating in a microwave oven and by heating caused by contact with a resistance heating element. However, all of these methods require considerable time in which to charge the pizza warmer and also require someone to attend to and monitor any such charging of a pizza warmer. Any additional time required to deliver pizzas is a major disadvantage since staying competitive requires the shortest delivery times. Likewise, the additional time required by someone to charge the pizza warmers takes personnel away from being able to take orders and make pizzas which adds cost and reduces efficiency.

The pizza warmer and oven system of the present invention enables a charged pizza warmer to be ready and available for use in delivering hot pizzas to the consumer without adding to the delivery time or requiring more than minimal effort or attention. The pizza warmer of the invention is generally circular in shape, one embodiment having flats on opposing lateral sides, and contains a phase change material, hereinafter referred to as ("PCM") which, when charged, gives up its latent heat of fusion to keep the pizza hot during delivery. The pizza warmers are charged in an oven equipped to hold and charge a plurality of pizza warmers, each in a separate chamber or slot. Heating elements in each slot charge the pizza warmer and the insulated oven maintains the pizza warmers at their preferred useful temperature. When a pizza must be delivered, an already charged pizza warmer can be removed from the oven, a hot pizza can be placed on the warmer and they can both be placed in an insulated box for delivery to the consumer. During delivery the warmer releases some of its latent heat of fusion, keeping the pizza hot for delivery.

Other advantages and attributes of this invention will be readily discernable upon a reading of the text hereinafter.

SUMMARY OF THE INVENTION

An object of this invention is to provide a pizza warmer and oven system for charging a plurality of pizza warmers and maintaining their preferred charged temperature in readiness for use to keep pizza hot during delivery to a consumer.

An additional object of this invention is to provide a pizza warmer and oven system having a plurality of pizza warmers which contain a phase change material.

An additional object of this invention is to provide disk shaped pizza warmers.

An additional object of this invention is to provide disk shaped pizza warmers having opposing flats parallel to a longitudinal axis through a handle.

An additional object of this invention is to provide a pizza warmer having a handle near its perimeter.

An additional object of this invention is to provide a pizza warmer having a handle for grasping which stays cool to the touch, allowing ease of handling of charged pizza warmers.

An additional object of this invention is to provide an oven having a plurality of pizza warmer charging slots, each of which can charge a pizza warmer to its preferred charged temperature.

An additional object of this invention is to provide an oven having charging slots that will accept a pizza warmer with opposing flats only if properly aligned.

An additional object of this invention is to provide an oven having heating elements affixed to the top and bottom shelves adjacent each charging slot.

An additional object of this invention is to provide an oven in which pizza warmers inserted into the charging slots are maintained in close proximity to the slot's top and bottom shelves for heating by the heating elements.

An additional object of this invention is to provide an oven in which the top shelves are biased downward, maintaining the heating elements in close proximity to the top and bottom surfaces of installed pizza warmers.

An additional object of this invention is to provide an oven with charging slot top shelves which can be raised to allow the easy removal and insertion of pizza warmers.

An additional object of this invention is to provide an oven in which the charging slot's top shelves are gravitationally biased downward but can individually be lifted by the insertion of a pizza warmer.

An additional object of this invention is to provide an oven in which all the charging slot's top shelves can be lifted in unison.

An additional object of this invention is to provide an oven in which a cam plate can be rotated by a lever.

An additional object of this invention is to provide an oven in which a lift plate can be raised by cams on the cam plate engaging cams on the lift plate when the cam plate is rotated by the lever.

An additional object of this invention is to provide an oven in which the lift plate is affixed to the top shelves, by means of lift rails, allowing the top shelves to be raised and lowered with the lift plate.

An additional object of this invention is to provide an oven having detent balls in the cams to maintain the position of the cams when in the raised position until the lever is used to move the cams.

An additional object of this invention is to provide an oven in which the insertion of a pizza warmer in a charging slot completes the lighting circuit through the warmer.

An additional object of this invention is to provide an oven in which switches enable the heating elements to each charging slot when a pizza warmer is installed therein.

An additional object of this invention is to provide an oven in which each shelf has a thermostat for maintaining the pizza warmers at their preferred charged temperature.

An additional object of this invention is to provide an oven in which indicator lights indicate whether each pizza warmer has obtained its preferred charged temperature.

An additional object of this invention is to provide an oven in which indicator lights indicate whether each pizza warmer is being charged, or has obtained its preferred charged temperature.

An additional object of this invention is to provide an oven in which the top shelves are held against an installed pizza warmer by gravity.

An additional object of this invention is to provide an oven in which the charging slot's bottom surfaces can be lowered for release or insertion of warmers and lifted into close proximity with the warmer for charging.

A further object of this invention is to provide an oven which allows the handles of charged pizza warmers to remain unheated, enabling the charged pizza warmers to be safely grasped.

These objects, and other objects expressed or implied in this document, are accomplished by disk shaped pizza warmers containing a phase change material such as fiberboard impregnated with a phase change material, an individual warmer or a plurality of the warmers can be charged to their preferred useful temperature by charging them in an oven having a plurality of charging slots to heat the warmers. The slots are defined by upper and lower shelves, each containing a heating element positioned to be in close proximity with the warmers in the charging slots. The upper shelves are gravitationally biased downward but can easily be raised by insertion of a warmer. The gravitational biasing of the upper shelves keeps them against the upper surface of the warmers. The warmers have a handle defined near a perimeter and opposing flats parallel to a longitudinal axis centered through the handle. Guides along the sides of the slots allow the warmers to be inserted only when the warmers' flats are aligned parallel to the sides of the slots. Inserting a warmer into a charging slot allows spring contacts in the sides of the slot to make electrical connection with the warmer's thermal switch circuit contacts in the flats. When the warmer has been heated to its desired operating temperature, the thermal switch closes, causing the slot's charging light to indicate that the warmer has been charged. A thermostat for each charging slot allows the heating elements to keep the warmer at its preferred temperature. The warmer's handle remains outside of the charging slot when the warmer is installed, allowing a charged warmer to be safely grasped by the handle when needed for use. When needed, a warmer can be removed from the oven, inserted in an insulated container with a pizza to keep the pizza hot during delivery to the consumer.

These objects, and other objects expressed or implied in this document, are also accomplished in an additional embodiment by disk shaped pizza warmers containing a phase change material such as fiberboard impregnated with a phase change material, a plurality of the warmers can be charged to their preferred useful temperature by charging them in an oven having a plurality of charging slots to heat the warmers. The slots are defined by upper and lower shelves, each containing a heating element positioned to be in close proximity with the warmers in the charging slots. The upper shelves can be raised for ease of removal or insertion of the warmers. The upper shelves are lifted by lift rails affixed to a lift plate which is raised by cams which engage when a the movement of a lever causes a cam plate to rotate, thereby engaging the cams. Inserting a warmer into a charging slot trips a switch which starts a timing circuit and applies power to the heating elements. The timing circuit turns on indicator lights to indicate the charging of the warmers. When the preset charging time has expired the charging indicator lights are turned off and the charged indicator lights are lit. A thermostat for each charging slot allows the heating elements to keep the warmer at its preferred temperature. The warmers have a handle defined near a perimeter which remain outside of the charging slot when the warmer is installed, allowing a charged warmer to be safely grasped by the handle when needed for use. When needed, a warmer can be removed from the oven, inserted in an insulated container with a pizza to keep the pizza hot during delivery to the consumer.

BRIEF DESCRIPTION OF THE DRAWINGS

FIG. 6 is a partial pictorial view of the lever extending from a slot in the surface of the oven.

FIG. 7 is an elevational view of the cam and cam follower at the beginning of engagement.

FIG. 8 is an elevational view of the cam and cam follower at the completely lifted position.

FIG. 9 is a partial view of FIG. 5 but with the upper shelves lifted for insertion or removal of the pizza warmers.

FIG. 10 is a sectional view taken at line 10—10 in FIG. 4.

FIG. 17 is a partial view of FIG. 16 but with the upper shelves shown in their uppermost positions.

FIG. 18 is a sectional view taken at line 18—18 in FIG. 14.

FIG. 19 is a partial plan view of an inner wall and contact shown in FIG. 15.

FIG. 20 is an exploded view showing the assembly of parts in FIG. 19.

DESCRIPTION OF THE PREFERRED EMBODIMENT

Figures 1, 2:
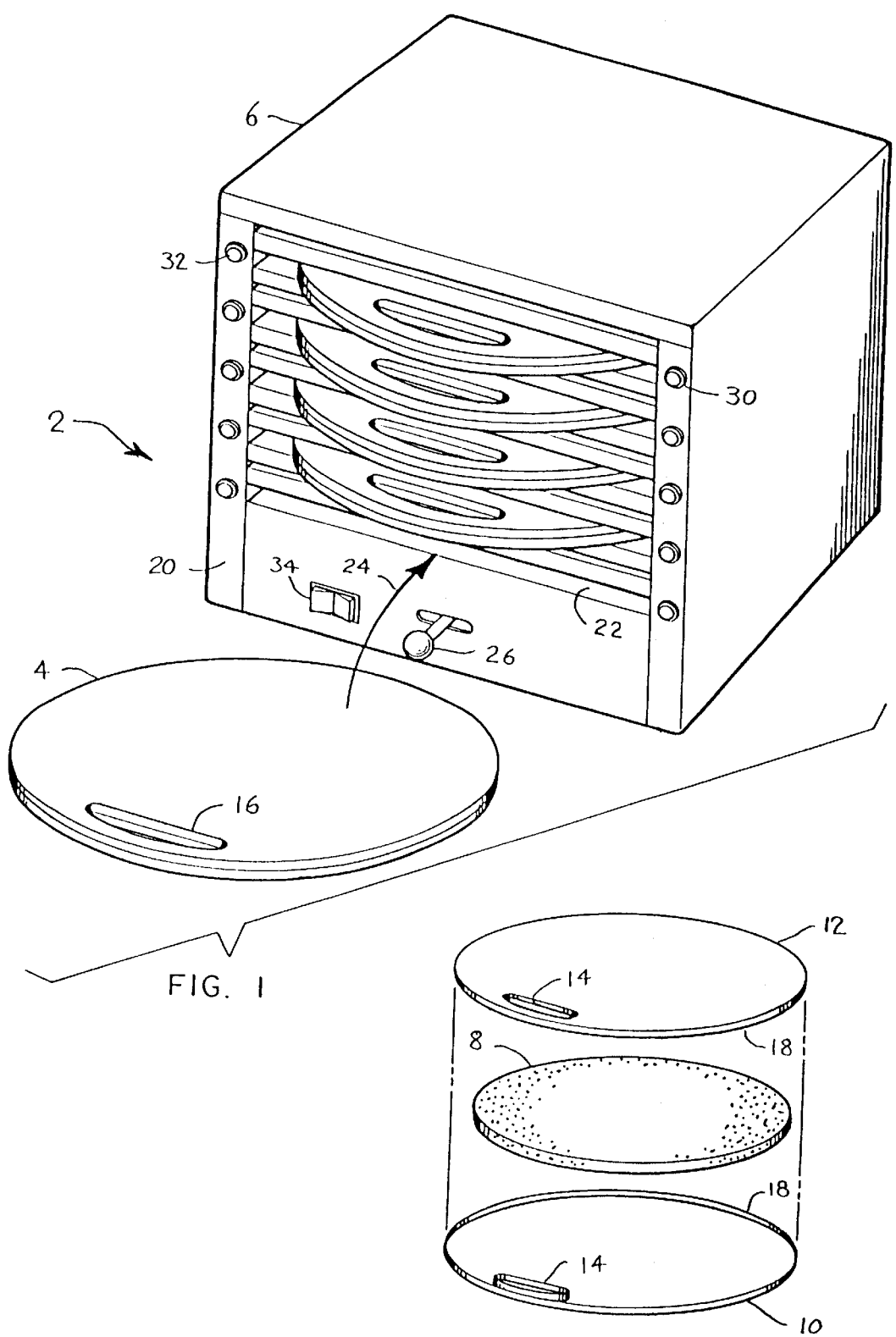
FIG. 1 is a pictorial view of the pizza warmer and oven system of the invention partially exploded to show a pizza warmer ready for insertion into the oven.
FIG. 2 is an exploded pictorial view of a pizza warmer.

Referring to FIG. 1, the pizza warmer and oven system of this invention designated generally as 2 is shown pictorially with a single pizza warmer 4 ready for insertion into the oven 6 which contains a plurality of additional pizza warmers installed in the oven. When the pizza warmers are installed in the oven they are heated and maintained at a preferred temperature of 105° C. for use, as needed, to keep pizzas hot during delivery to a consumer.

Referring to FIG. 2, an exploded pictorial view of a pizza warmer 4 is shown. PCM 8, preferably in the form of a disk of fiberboard impregnated with phase change material, is assembled in sandwich fashion between a bottom cover 10 and a top cover 12. Flanges 14 on the covers meet to form a handle 16, defined proximate an edge of the covers (shown in FIG. 1). As used herein, the terms "upper," "lower," "top," and "bottom" are arbitrarily selected directional references with "upper" and "top" referring to the general gravitational upward direction and "lower" and "bottom" referring to the opposite direction. Edge flanges 18 on the covers meet to enclose the PCM. Alternately, the top cover can be slightly larger in diameter to allow its flange to fit over the flange on the bottom cover. The covers are held together by rivets, or other suitable fastener, through holes defined in a plurality of bosses spaced proximate the covers' perimeters. The disk of PCM 8 is shaped to fit between the covers but only extends to the innermost portion of flange 14. This allows the handle to remain at a cooler temperature than the pizza warmer when charged to its preferred temperature. The diameter of a pizza warmer 4 is preferably 14 inches, but could as well be made in other diameters. This will allow any pizza placed on a charged pizza warmer to be kept hot in an insulated container during delivery to a consumer. While the pizza warmer is preferably disk shaped, it could as well have its large surfaces formed in the shape of a rectangle or polygon.

The PCM 8 is preferably a combination of silica and crystalline alkyl hydrocarbons (wax or paraffin). The temperature at which the PCM changes phase, hereafter referred to as the "phase temperature" can be tailored by the composition of the materials combined to make the PCM. U.S. Pat. Nos. 5,211,949 and 5,282,994 by Salyer describe a variety of materials which can be used as PCM. The wax based PCM is formed in a disk shaped layer. A course netting can be used when forming the PCM to provide structural stability and keep the PCM in place if it should develop cracks.

Referring again to FIG. 1, the generally parallepiped shaped oven 6, has a front surface 20 defining a plurality of parallel, horizontally oriented, charging slots 22. While the oven would generally require the same height, its cross-section could be a circle, ellipse or polygon as well as a rectangle. The pizza warmers 4 can be inserted or removed from the charging slots as indicated by the direction of the insertion/removal arrow 24. The slots extend within the oven to a depth which limits a pizza warmer 4 inserted therein to be enclosed by the slot, except for the handle 16 and adjacent perimeter sector of the warmer which remains forward of the front surface. As used herein, the terms "forward," "front," "rear," and "back" are arbitrarily selected directional references with "forward" and "front" referring to the removal direction shown generally opposite that of arrow 24 and "rear" and "back" referring to the insertion direction of the arrow.

A lever 26 extending from a slot, defined generally in the center of the bottom margin of the front surface 20, controls the opening and closing of the charging slots 22. The lever is shown with a knob handle on its end but could be used without a knob and for convenience the reference to the lever also includes the knob. To open the charging slots to allow insertion of pizza warmers, the lever is moved in the direction of arrow 28. This causes the upper shelf of each charging slot to be lifted vertically upward slightly, allowing the pizza warmer(s) to easily be inserted for charging or removed for use when charged. When the pizza warmers have been inserted into the charging slots the lever is moved in the opposite direction of arrow 28, closing the slots to allow the pizza warmers to be charged. The insertion of a pizza warmer into a charging slot triggers a limit switch positioned at the rear of the slot which turns on heating elements and a timing circuit for that slot. Heating elements are affixed to the top and bottom shelves of each slot, in close proximity to the upper and lower surfaces of pizza warmers installed in the charging slots. The heating elements heat the pizza warmers, charging them to their preferred charged temperature. When the switch turns on the timing circuit, a preset charging time is started and the charging light 30 mounted in the right margin of the front surface 20 is turned on to indicate that the pizza warmer in that slot is being charged. When the preset charging time has elapsed, the charging light is turned off and the ready light 32 is turned on to indicate that the pizza warmer is charged. A thermostat is in the circuit with the heating elements for each slot to limit the temperature of the warmers to a preset temperature. The thermostat will allow the heating elements to maintain the temperature of the charged pizza warmer once initially charged. The charging time is based on the size of the pizza warmers and the PCM they contain to achieve the preferred charged temperature of approximately 105° C. A power switch 34 mounted in the margin of the front surface 20, preferably the bottom margin, controls electrical power to the oven. Operation of the above described opening and closing of the slots and installation, removal and charging of the pizza warmers will be described below in more detail.

Figure 4:
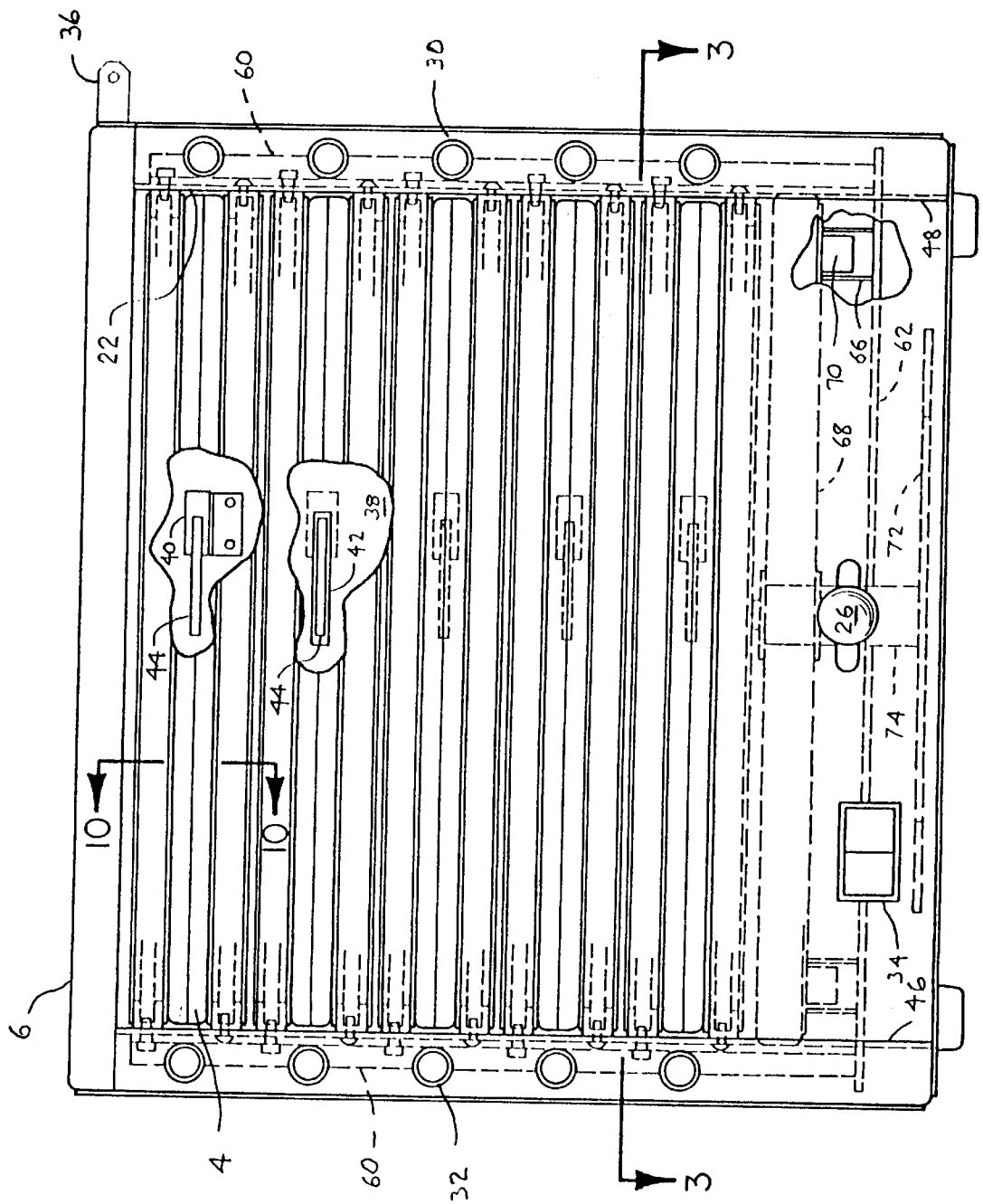
FIG. 4 is a front elevation view of the oven.

Referring to FIG. 4, the front of the oven 6 is shown with a plurality of pizza warmers 4 installed in a plurality of charging slots 22. Five charging slots are shown, but a different number could be included in an oven. Likewise, two or more ovens can be can be joined at their sides by use of joining straps 36 (only one shown) secured to the rear of the ovens to join one oven to an adjacent oven. The pizza warmers, when fully inserted into the charging slots, abut a rear inner wall 38. Limit switches 40 are mounted to the rear surface of the inner wall which has generally rectangular shaped, horizontal slots 42 defined therein at the rear of each charging slot. The switch levers 44 of the limit switch extend forward through the slots beyond the plane of the wall and are pushed to trip the limit switches by pizza warmers when inserted fully into the charging slots, as can more clearly be seen in FIG. 5.

Referring to FIGS. 1, 4 and 10, pizza warmers 4 are shown installed in the charging slots 22. The charging slots are defined by the rear inner wall 38, the left inner wall 46, the right inner wall 48, the lower shelves 50 and the upper shelves 52. The shelves each have a rectangular outer frame formed by side rails 54 along each edge of the shelf. The rails preferably have a generally "U" shaped cross-section and are assembled into the shelf frame with the opening of the "U" toward the inside and are preferably joined with mitered corners and top and bottom panels 56 affixed to the side rails by fasteners (not shown). The shelves each have a heating element 58 affixed to one of the inner surfaces of a top or bottom panel. On the lower shelves 50, the heating element is affixed to the inner surface of the top panel. On the upper shelves 52, the heating element is affixed to the inner surface of the bottom panel. The heating elements are affixed to the panels by fiberglass insulation compressed within the cavity between the heating element and the opposing panel 56 of each shelf. Heating element leads are fed through holes (not shown) defined in the rear side rail and the rear inner wall 38 to the heater control circuit (not shown). The lower shelves 50 are each fixed in their respective positions to the left inner wall 46 and the right inner wall 48 by fasteners through the walls to the side rails 54. The upper shelves are vertically moveable, in unison, by movement of the lever 26, as will be described in detail below.

Figure 3:
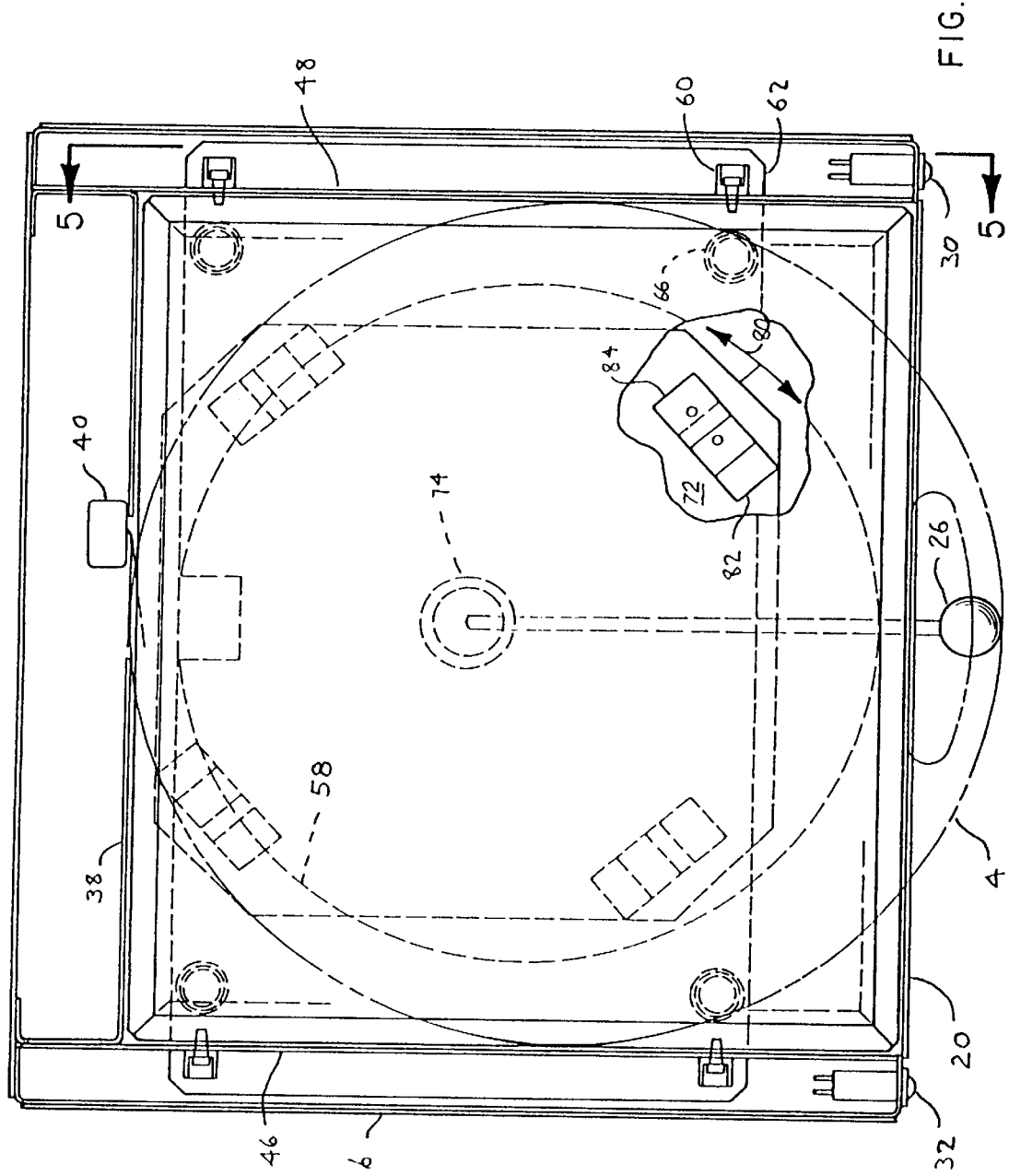
FIG. 3 is a sectional view taken at line 3—3 in FIG. 4.
Figure 5:
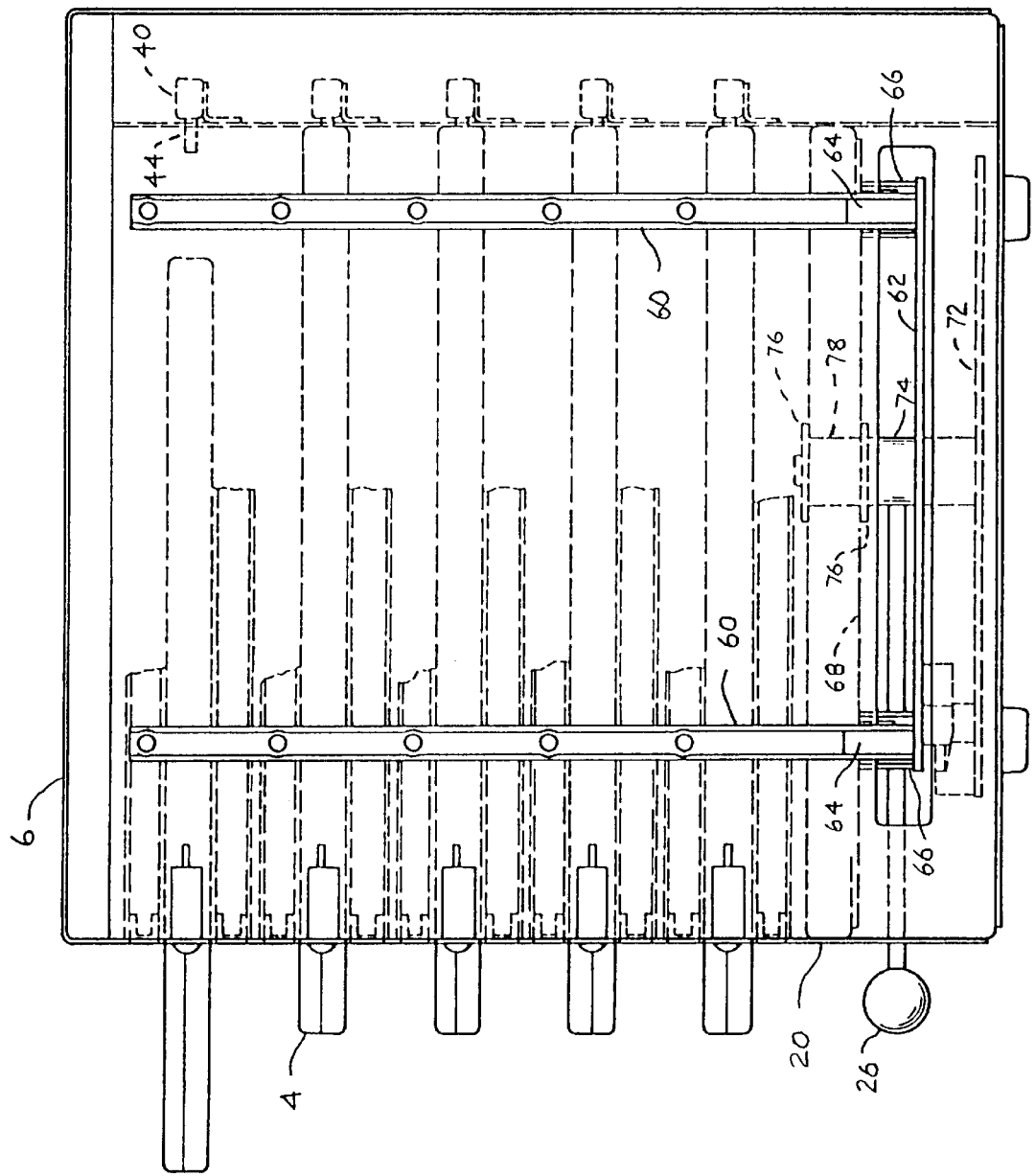
FIG. 5 is a sectional view taken at line 5—5 in FIG. 3.

Referring to FIGS. 3, 4 and 5, the upper shelves are each affixed to lift rails 60 by fasteners which extend through short vertical slots (not shown) defined in the left inner wall 46 and right inner wall 48. There are preferably four lift rails to which the upper shelves are affixed, two proximate the rear of the shelves and two proximate the front of the shelves and positioned proximate the outer surface of the left inner wall and the right inner wall. The lift rails are preferably "U" shaped in cross-section and are affixed perpendicularly to a lift plate 62, by means of lift rail plugs 64. A lift rail plug fits into the bottom of the "U" shaped cavity of each lift rail and is affixed to the rail and the lift plate by fasteners (not shown) to tie the rails to the lift plate. The lift plate is a generally rectangular plate which extends in a horizontal plane through generally rectangular slots proximate the bottom of the left inner wall 46 and right inner wall 48 to allow attachment of the lift plate. Raising the lift plate causes the lift rails to lift the upper shelves. However, in order to maintain the heating elements 58 in the upper shelves in close proximity to the pizza warmers 4 when they are installed in the charging slots 22, the upper shelves are biased in the downward position. This is accomplished by springs 66 held in position between a fixed shelf 68 and the lift plate. Preferably four springs proximate the corners of the fixed shelf bias the lift plate in the lowered position, each spring held in position between the fixed shelf and the lift plate by a spring plug 70. The spring plug is a cylindrical plug affixed coaxially inside the coils of the spring to the fixed plate by a screw through a coaxial hole defined in the plug.

Referring to FIGS. 3 through 10, a rotatable cam plate 72 is affixed proximate its center by two or more screws to a rotation hub 74 which extends through hub shaft holes (not shown) defined through the upper and lower panels of the fixed shelf 68 proximate its center. The cam plate is a rigid plate, having a generally square shape with truncated corners. The hub is cylindrically shaped, having a narrower shaft section (not shown) which extends through the hub shaft holes where it is pivotally affixed at the center of the fixed shelf. This is accomplished by extending the shaft through a bearing washer 76, the shaft hole in the fixed panel's lower panel, a cylindrical bushing 78, the shaft hole of the fixed panel's upper panel and another bearing washer 76. A retaining ring (not shown) secures the top of the shaft hub, allowing it to pivot about its vertical axis. The lever 26 is affixed radially into a threaded hole in the hub below the fixed shelf. Moving the lever in the direction (counter-clockwise) of arrow 28 causes the hub to rotate about its vertical axis which in turn causes the cam plate 72 to rotate in the counter-clockwise direction of cam plate arrow 80. A plurality of cams 82 are affixed to the upper surface of the cam plate, each the same radial distance from the axis of the hub. Preferably four lift ramps are affixed proximate the cam plate's truncated corners. Cam followers 84 are affixed to the bottom surface of the lift plate 62, preferably in the same numbers and aligned at the same radial distance from the hub's axis as the cams. The cams and cam followers each have ramps 86, inclined surfaces which engage when the cam plate is rotated. The cams and cam followers are oriented as shown in FIG. 7, preferably with their ramps slightly engaged. As the lever 26 is turned counter-clockwise in the direction of arrow 28 it causes the rotation hub 74 to rotate, causing the cam plate 72 to rotate, also counter-clockwise. The cams 82 affixed to the cam plate move in the direction of ramp arrow 88 causing the cam's ramp 86 to move under the cam follower's ramp, thereby lifting the cam follower and causing the lift plate 62 to be raised. Additional movement of the cam causes the cam follower 84 to move completely up the cam's ramp to a horizontal surface 90, lifting the lift plate as it moves. The raising of the lift plate, causes the lift rails 60 to also be raised which, in turn, raises the upper shelves 52 in unison. A detent 92, resiliently biased to protrude above the horizontal surface 90, along the cams longitudinal midline (not shown), seats itself into a detent hole 94 defined vertically in the cam follower 84. The hole is positioned beyond the ramp 86 and along the cam follower's longitudinal midline (not shown). When the detent is seated as shown in FIG. 8, the upper shelves will remain raised, allowing pizza warmers 4 to be inserted into, or removed from, the charging slots 22. The cam also has a stop 96 which prevents the cam plate 72 from being moved beyond the detent seating position. The stop is a step or shelf at the end of the cam.

As soon as the pizza warmers have been inserted, or removed from, the charging slots, the lever 26 can be moved in a clockwise direction (opposite arrow 28). This will cause the cam plate 72 to also move in the clockwise direction of arrow 80, causing the cams 82 to be pulled away from the cam followers 84, allowing the cam followers to ride down the ramps 86, lowering the upper shelves 52 to rest next to the upper surfaces of the pizza warmers 4. This keeps the heating elements in the upper and lower shelves 52/50 in close proximity with the pizza warmers as shown in FIG. 10.

The upper shelves 52 could also be made to be raised directly by the manual insertion or removal of a pizza warmer. The upper shelves could also be free to be pulled into their lowered position against the pizza warmers by gravitational pull.

In a similar manner as described above, the lower shelves 50 could be biased upward and could be adjustable so they could be lowered to allow the insertion or removal of pizza warmers in or out of the charging slots 22.

Figure 11:
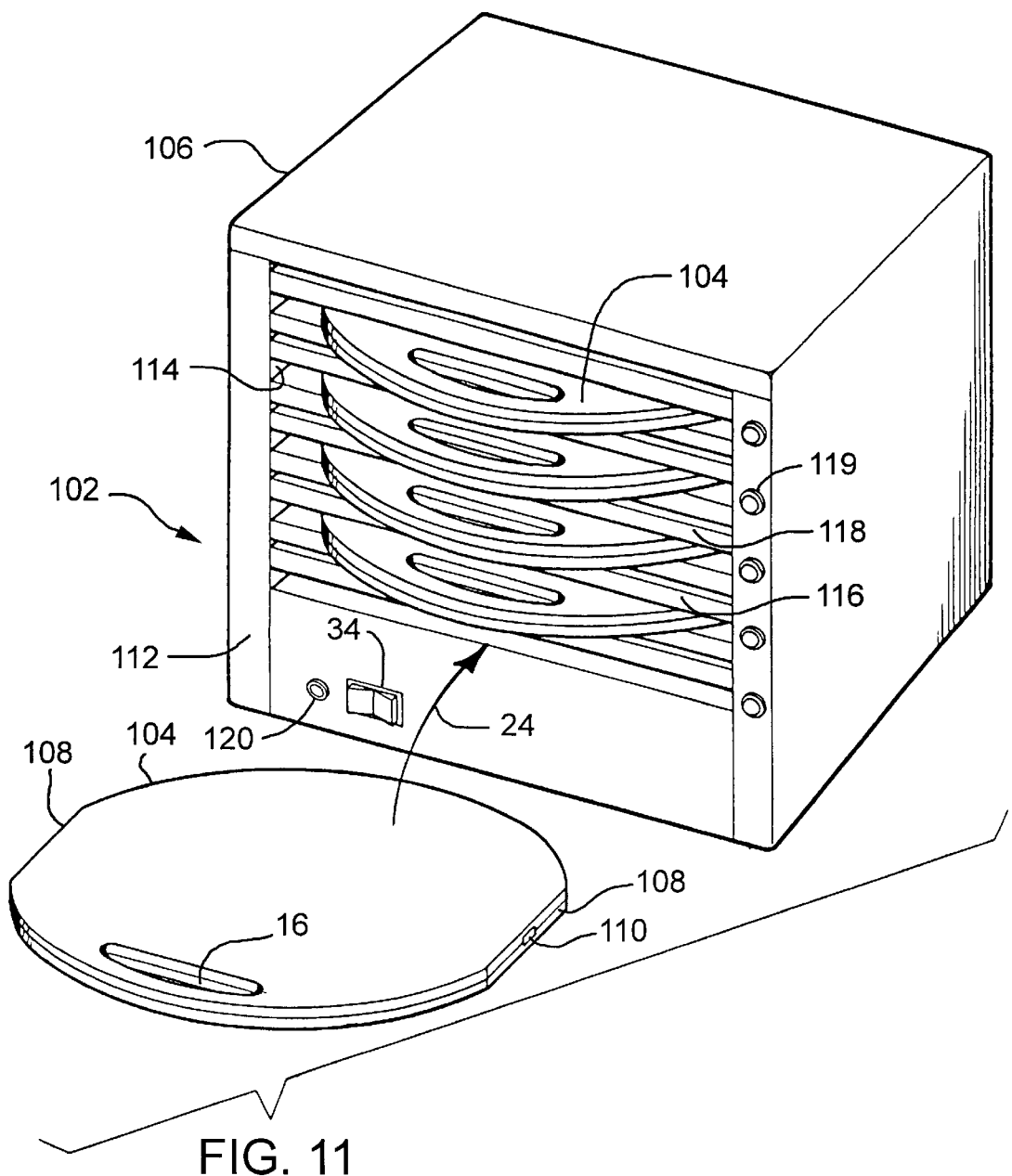
FIG. 11 is a pictorial view of the pizza warmer and oven system of an additional embodiment of the invention partially exploded to show a pizza warmer ready for insertion into the oven.

Referring to FIG. 11, an additional embodiment of the pizza warmer and oven system of this invention designated generally as 102 is shown pictorially with a single pizza warmer 104 ready for insertion into the oven 106 which contains a plurality of additional pizza warmers installed in the oven. The pizza warmer is generally disk shaped, having two opposing, parallel flats 108 aligned generally with the warmer's longitudinal axis (not shown) running through the center of the handle 16 defined near the perimeter of the disk. The flats are the lateral sides of the warmer and centrally positioned in each flat is a lighting circuit contact 110. The oven's front surface 112 defines a plurality of charging slots 114, each having a lower shelf 116 and an upper shelf 118. The pizza warmers 104 are inserted into the oven by grasping the handle 16 and pushing them into the charging slots as indicated by arrow 24. When the pizza warmers have been charged to their operating temperature, ready lights 119, mounted in the front surface adjacent to the charging slots, light up. A power switch 34 and a fuse holder 120 are also preferably mounted on the front surface 112.

Figure 12:
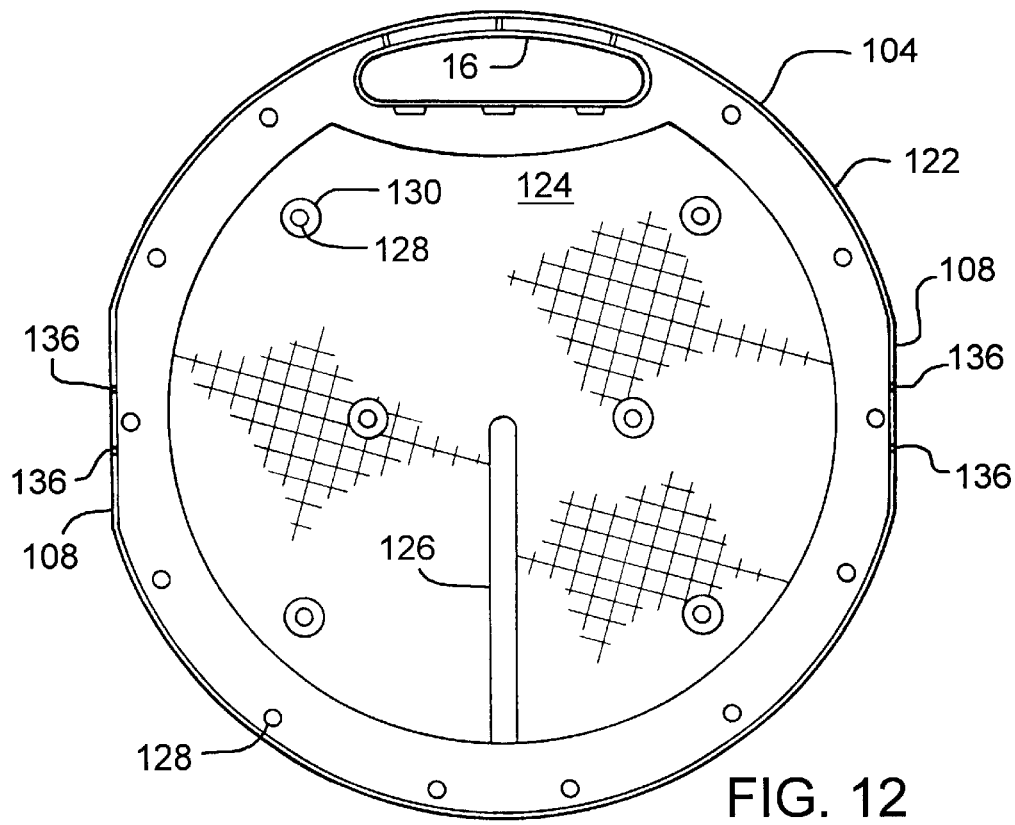
FIG. 12 is a plan view of the inside of a top shell of an open pizza warmer of an additional embodiment with a PCM layer in the shell.
Figure 13:
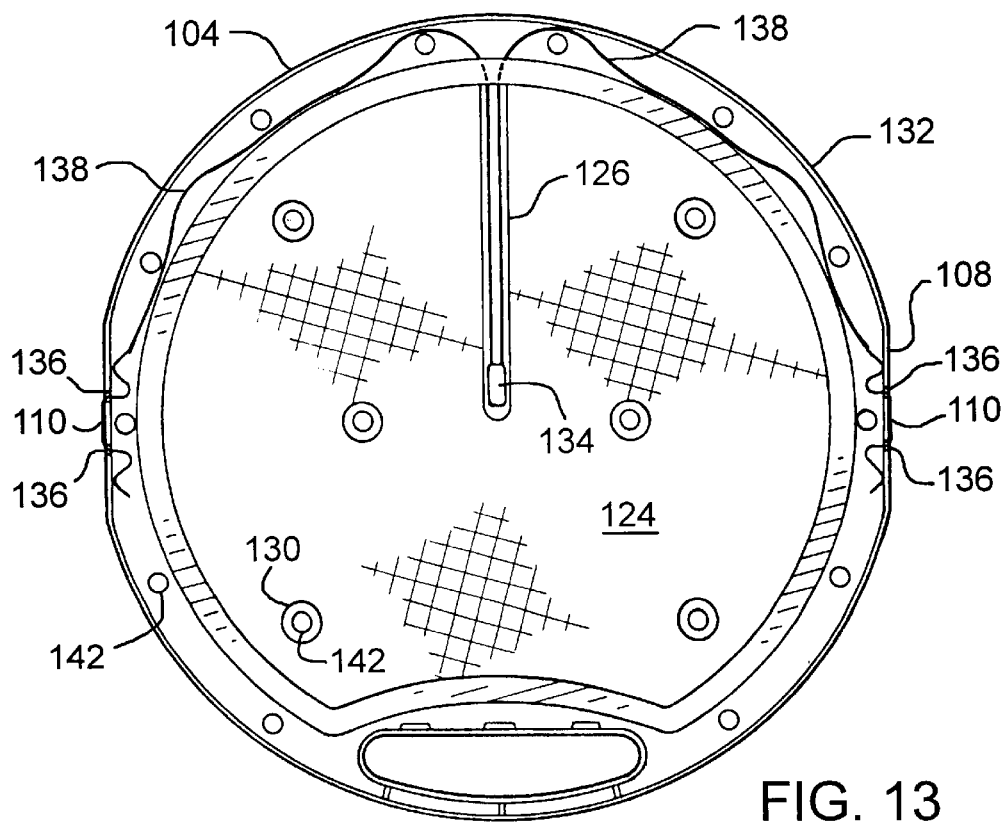
FIG. 13 is a plan view of the inside of a bottom shell of an open pizza warmer of an additional embodiment, showing a PCM layer, thermal switch and associated wiring.

Referring to FIGS. 12 and 13, a pizza warmer 104 is shown opened up, the top shell 122, shown from the inside has a layer of PCM 124 shown in place, generally centrally located in the shell. A shallow, radial groove 126, generally aligned with the longitudinal axis of the pizza warmer is defined in the exposed surface of the PCM layer opposite the handle 16 defined in the shell. The top shell has a plurality of studs or male bosses 128 extending perpendicularly from the generally flat surface of the top shell, some of which extend through clearance holes 130 defined in the PCM layer. The bosses are designed to fit into mating bosses in the bottom shell 132 to fasten the two shells together. A layer of PCM 124 is also positioned centrally in the bottom shell, having its shallow groove 126 aligned with the longitudinal axis and positioned opposite the handle 16. A thermal switch 134 is positioned in the center of the PCM layer at the end of the groove. Contact slots 136 defined in the edges of the flats 108 hold the lighting circuit contact 110 in position. The contact is preferably formed from a resilient phosphor bronze metal, or equivalent, of the type typically used for spring contacts. The contact has a straight, contact section with bends formed at each end. The contact is inserted into the contact slots 136 with the straight, contact section fitting against the outside edge of the flats 108 and the bends serving as springs biased against the inside edge of the flats to hold the straight contact section tight against the outside edge. The thermal switch 134 is in electrical communication with the lighting circuit contacts 110 by wires 138 passing through the groove 126 and the inside perimeter of the shell. A strip of insulating material 140 is positioned around the perimeter of the PCM layer to reduce radial loss of heat and to assist in keeping the handle cool for grasping. The bottom shell has a plurality of female bosses 142 extending perpendicularly from the generally flat surface of the bottom shell and positioned to align with the male bosses 128 of the top shell when the two shells are pressed together to form the pizza warmer 104. In pressing the two shells together, the male bosses frictionally fit into the female bosses, holding the shells together. The bosses are of sufficient length to allow an adequate frictional fit when the bosses are pressed together. The top and bottom shells can have the same corresponding dimensions allowing the edges to meet along a circumferential seam. Or, preferably, one shell can be slightly smaller than the other, allowing each to have an offset lip (not shown), one formed outward and the other formed inward so that they overlap to form a more airtight circumferential seam. An overlapping seam could also be formed by an offset lip on just one of the shells otherwise having the same dimensions. With the two shells fitted together, the thermal switch is located in the center of a tunnel formed by the channels 126 in the PCM layers 124, providing the optimum location for sensing the temperature of the PCM.

Figure 14:
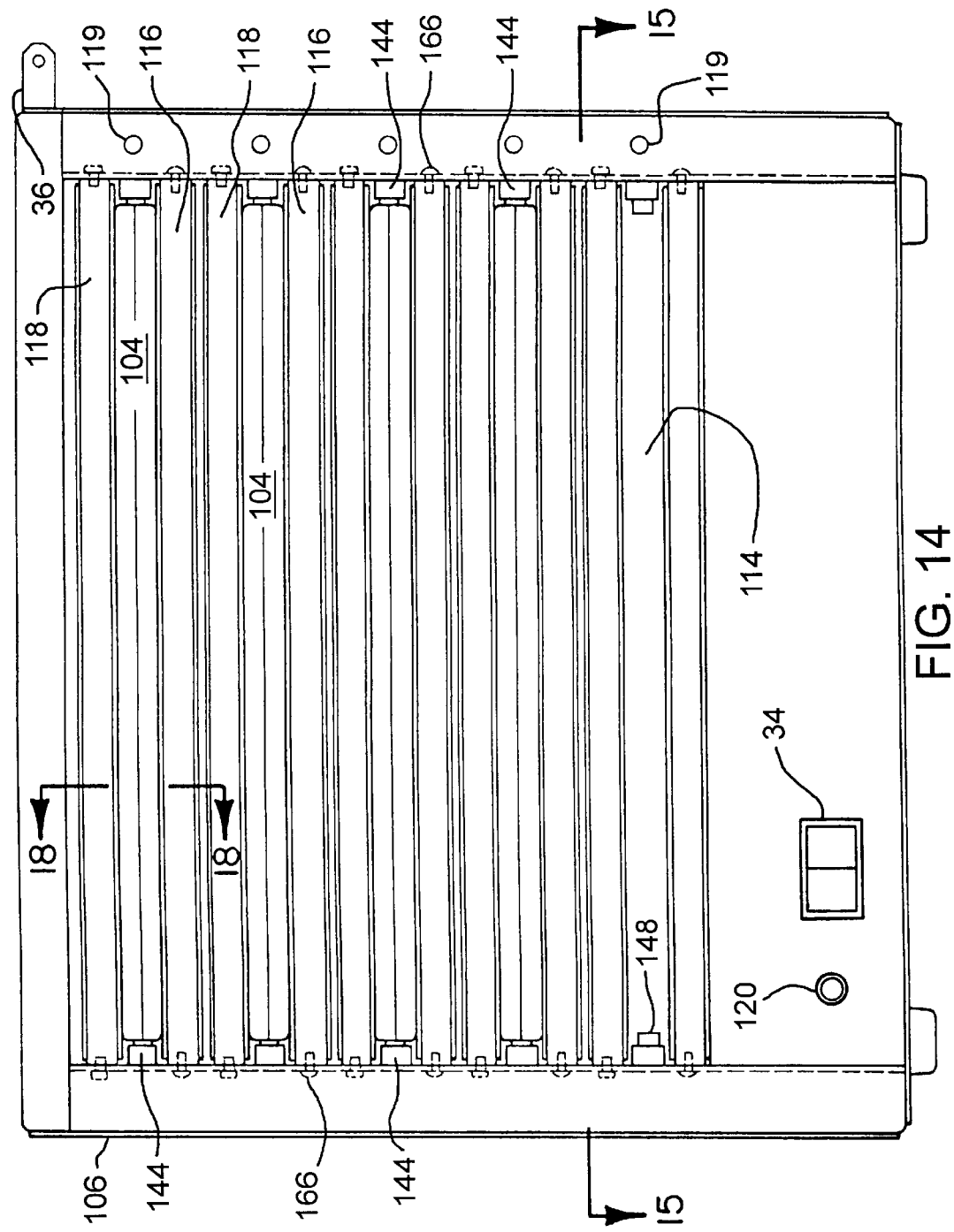
FIG. 14 is a front elevation view of the oven of an additional embodiment.
Figure 15:
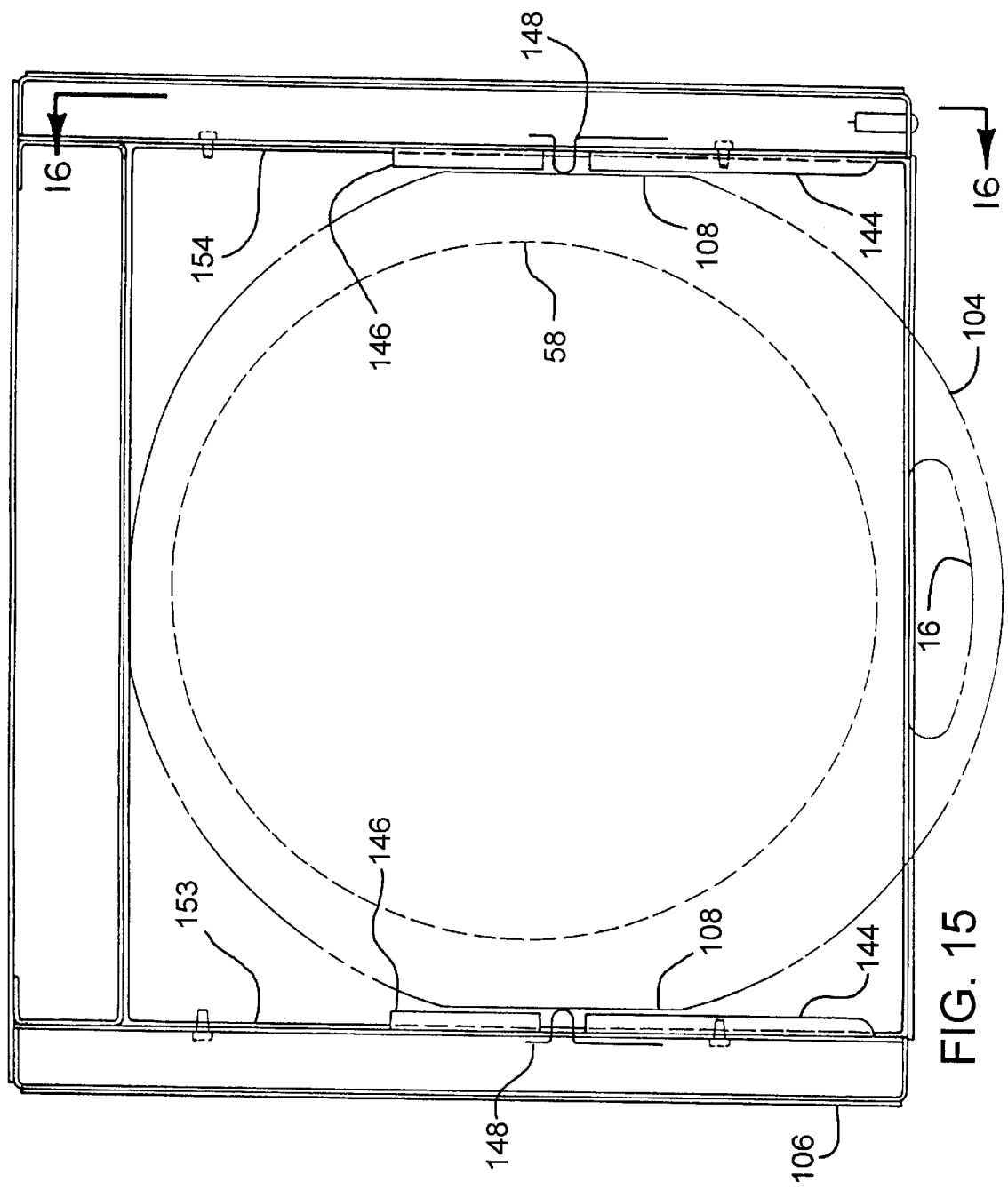
FIG. 15 is a sectional view taken at line 15—15 in FIG. 14.

Referring to FIGS. 14 and 15, a plurality of pizza warmers 104 are shown installed in the oven 106. When installed, the warmers are sandwiched between fixed, lower shelves 116 and floating, gravitationally biased, upper shelves 118 which rest on the warmers. Front 144 and rear guides 146 affixed to the left inner wall 153 and the right inner wall 154 (the side walls of the charging slots 114) control the installation of the warmers to an alignment which is parallel with the flats 108 and prevent them from being twisted. This assures that the lighting circuit contacts 110 (See FIG. 13) on the flats 108 will be in the proper position to enable contact by the spring contacts 148. The spring contacts are biased to extend into the sides of the charging slots between the front and rear guides and make contact with the lighting circuit contacts. When the warmers are properly installed, their handles 16 remain outside the oven, allowing them to remain cool for grasping. The lower shelf 116 and upper shelf 118 each contain a resistance heating element 58, indicated by the dotted line in FIG. 15, to show its relationship to the position of the pizza warmers 104 when installed in the oven. The heating element is positioned to essentially cover the entire area of the PCM layers 124 (See FIG. 13) in the pizza warmers.

Referring to FIGS. 15, 16, 19 and 20, an insulating board 150 holds a plurality of spring contacts 148 in proper position for each pizza warmer 104. The insulating board has a clearance hole 152 defined in it for each spring contact. The clearance holes align with clearance holes (not shown) defined in the left inner wall 153 and the right inner wall 154. The clearance holes allow the spring contact to extend through the insulating board and the inner walls to make contact with the lighting circuit contact 110 on the warmer's flats 108. An insulating board 150 is affixed to the outside of both the left inner wall and the right inner wall. The insulating board has a front edge 155. The insulation board is installed with this edge nearest the front of the oven. This allows the spring contacts on both sides to pivot as mirror images when a warmer is inserted in a charging slot.

Referring to FIGS. 19 and 20, the installation of the insulating boards 150 will be described in relation to the right inner wall 154. An insulating tape or strip 156 is affixed to the outside surface (side opposite the charging slot 114) from proximate the topmost upper shelf 118 to proximate the lowest lower shelf 116, aligned vertically with the front edge 155 of the insulating board 150. A flat-head screw 158 inserted from the wall side of the insulation board into a countersunk hole defined in the insulation board and a hole defined in the spring contact 148 serves as a terminal for electrical communication to the lighting circuit, such as by wire W. A nut 160 or appropriate fastening device is used to secure wire W to the terminal of screw 158. The insulation board is affixed to the wall at each spring contact by screw 162 through insulating shoulder washer 164 and holes defined in the spring contact, insulation board, wall and into a threaded hole defined in front guide 144. Likewise, screws 162 through holes defined in the insulation board, wall and into threaded holes defined in the rear guide 146 are used to affix the insulation board and rear guide to the right inner wall 154. Proper placement of the insulation board assures that the spring contacts 148 will be able to make contact with the lighting circuit contacts 110 on the warmers 104 through the holes 152 defined in the insulation board and wall.

Figure 16:
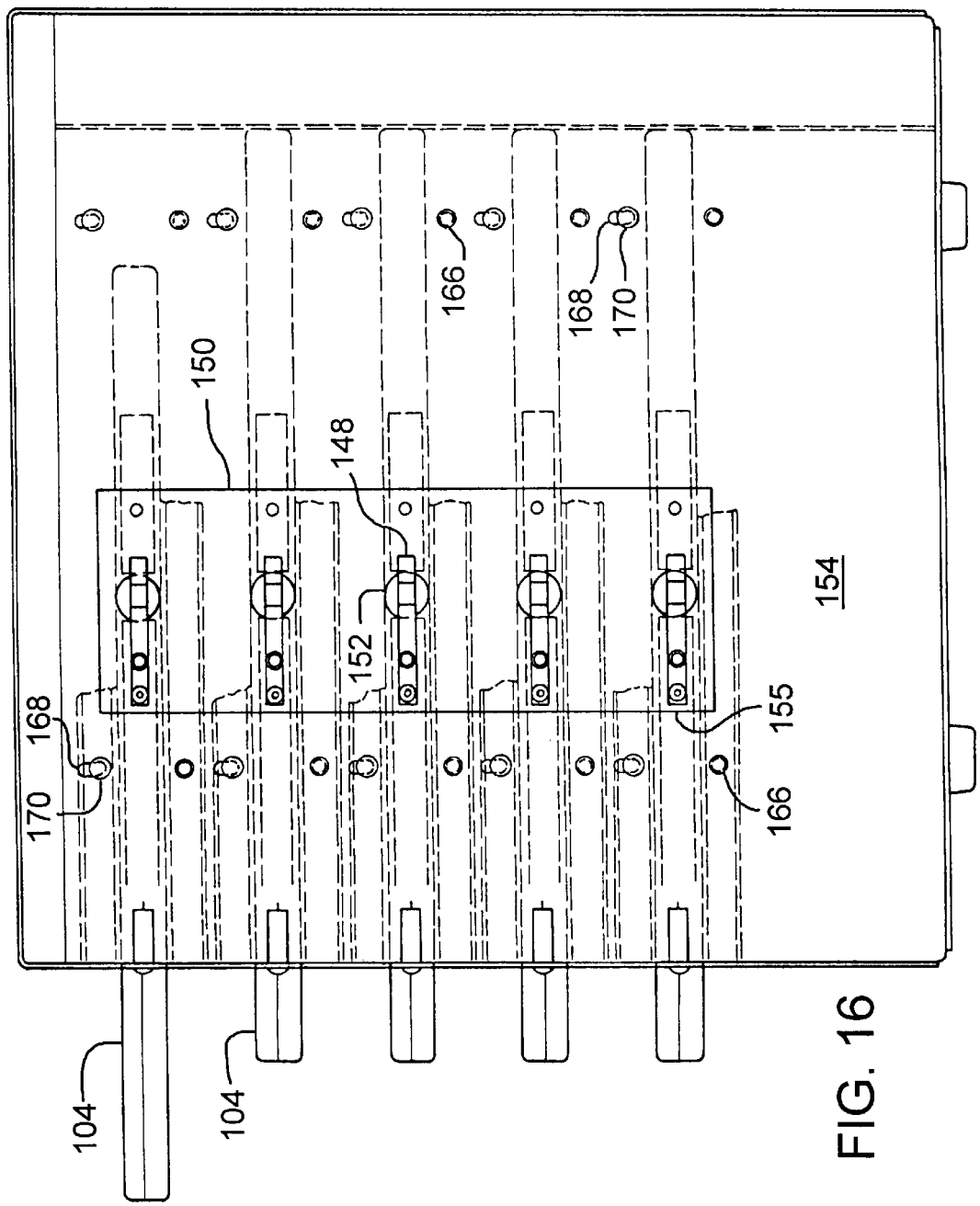
FIG. 16 is a sectional view taken at line 16—16 in FIG. 15.

Referring to FIGS. 14, 16 and 17, the lower shelves 116 are fixed and held in place by screws 166 through holes defined in the left inner wall 153 and the right inner wall 154. The upper shelves 118 are vertically moveable in a narrow range allowed by oval holes 168 defined in the wall. The oval holes' long axis is vertical. The upper shelves are held in place by shoulder screws 170 through the oval holes, allowing the shelves to be vertically moveable. The shelves are downward biased, gravitationally, and will rest in the downward position (shown in FIG. 16), thereby maintaining the shelves' bottom surface adjacent the top surface of an installed pizza warmer 104. When a pizza warmer is installed in a charging slot it will raise the upper shelf. FIG. 17 shows all of the upper shelves in their uppermost position, but each shelf is free to be moved to its uppermost position independently of the others.

Referring to FIG. 18, a partial cross-section of a pizza warmer 104 installed between a lower shelf 116 and an upper shelf 118. The shelves' front side is radiused where it is adjacent a warmer, allowing a warmer to be easily inserted between the shelves, the upper shelf floating on the warmer during installation and then resting on it after installation. The shelves have an outer pan 172 having sides the same height as the shelves' thickness. A shallow inner pan 174 fits inside the upper edges of the outer pan to form a flat surface and complete the shelf enclosure. The inner pan is fastened to the outer pan using appropriate fasteners (not shown). The rear of the pan contains at least one opening (not shown) defined in the outer pan for necessary wiring to the heating element. The heating element 58 is placed in position on the inside bottom surface of the outer pan 172. High temperature aluminum tape 176 (See FIG. 21) is used to hold the heating element in position to the pan. A thick layer, approximately one-half inch, of high temperature fiberglass insulation (not shown), such as that available from McMaster-Carr, No. 9356K11, is placed over the heating element in the outer pan. The insulation is compressed when the inner pan is installed into the outer pan. The insulation assures that the heating element remains adjacent the inner pan's bottom shelf to so that its heat transfers through that surface into the pizza warmer 104. An adhesive-backed silicone gasket 178 is affixed along the front side of the outer pan. The gasket is tubular, having a "pie-shaped" cross-section, such as that available from McMaster-Carr, No. 1067A27, and serves to prevent a user's fingers from touching the hot shelves while grasping the handle 16 when inserting or removing a pizza warmer from the oven. The gasket is affixed to the front side with the pointed end adjacent the outer pan's edge, the wide part of the gasket proximate the radiused part of the front side. This allows the wide part of the gasket to be nearest the pizza warmer when installed. The gasket is not shown in other figures to prevent loss of clarity.

Figure 21:
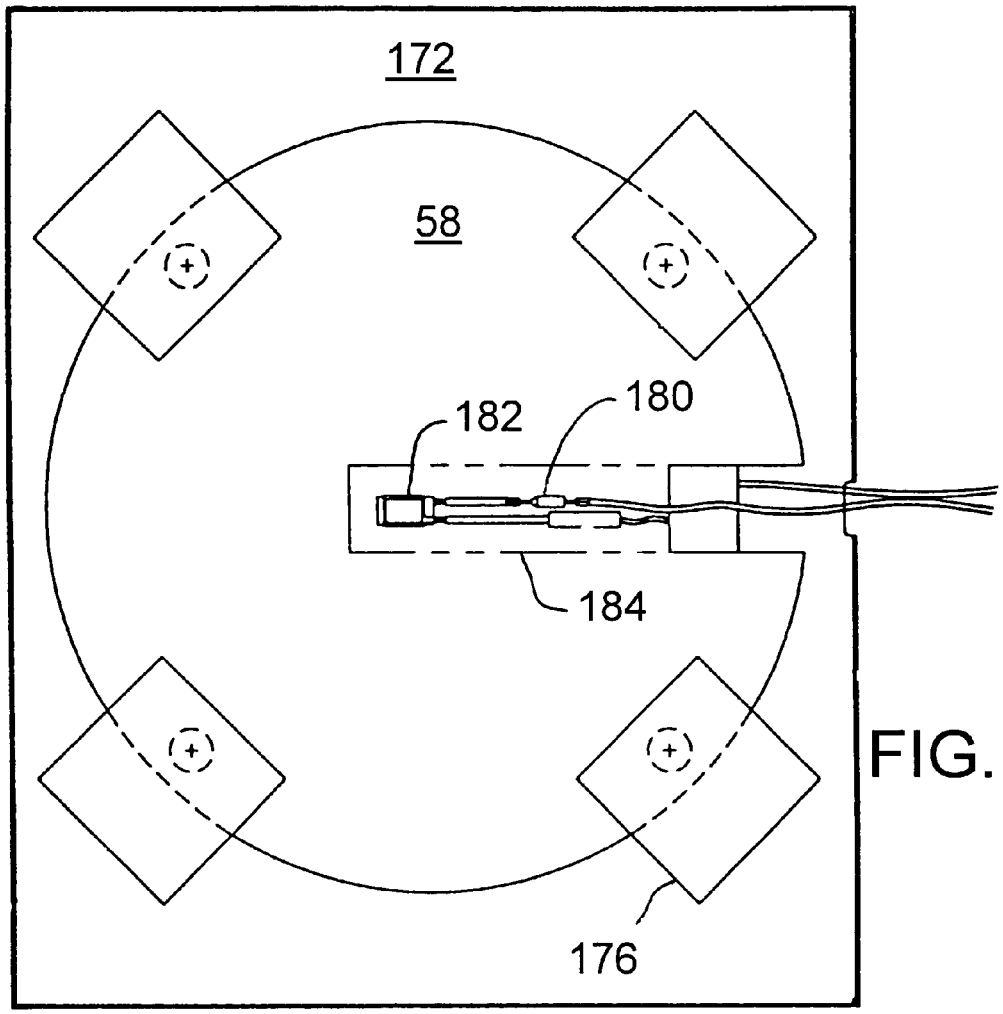
FIG. 21 is a plan view of an outer pan of a shelf showing the heating element and parts of the heating circuit.

Referring to FIG. 21, the heating element 58 is centrally positioned in the bottom of the outer pan 172. It is held in position by high temperature aluminum tape 176. The heating element is a resistive circuit enclosed in a flexible silicone layer. A thermo-fuse 180 and a thermostat 182 are connected, in series, to one of the leads to the heating element. The thermo-fuse and the second lead to the heating element are connected by wiring to the oven's AC power circuit. The thermo-fuse is a wax pellet fuse and serves as a safety feature. It is designed to open when its temperature exceeds a pre-determined amount, preferably 290° F., preventing damage to other components due to excessive current. The thermostat is positioned approximately over the center of the heating element to get the best representative temperature of the heating element. The thermostat is normally closed and allows the heating element to heat until a pre-selected temperature, preferably approximately 105° C. (220° F.) is reached and then it opens, shutting off power to the heating element. The thermostat will maintain the temperature of the heating element between approximately 212° F. and 230° F. A silicone insulation cover 184 is adhesively affixed to the surface of the silicone heating element 58 and keeps the thermostat, thermo-fuse and wiring in position after their assembly.

Figure 22:
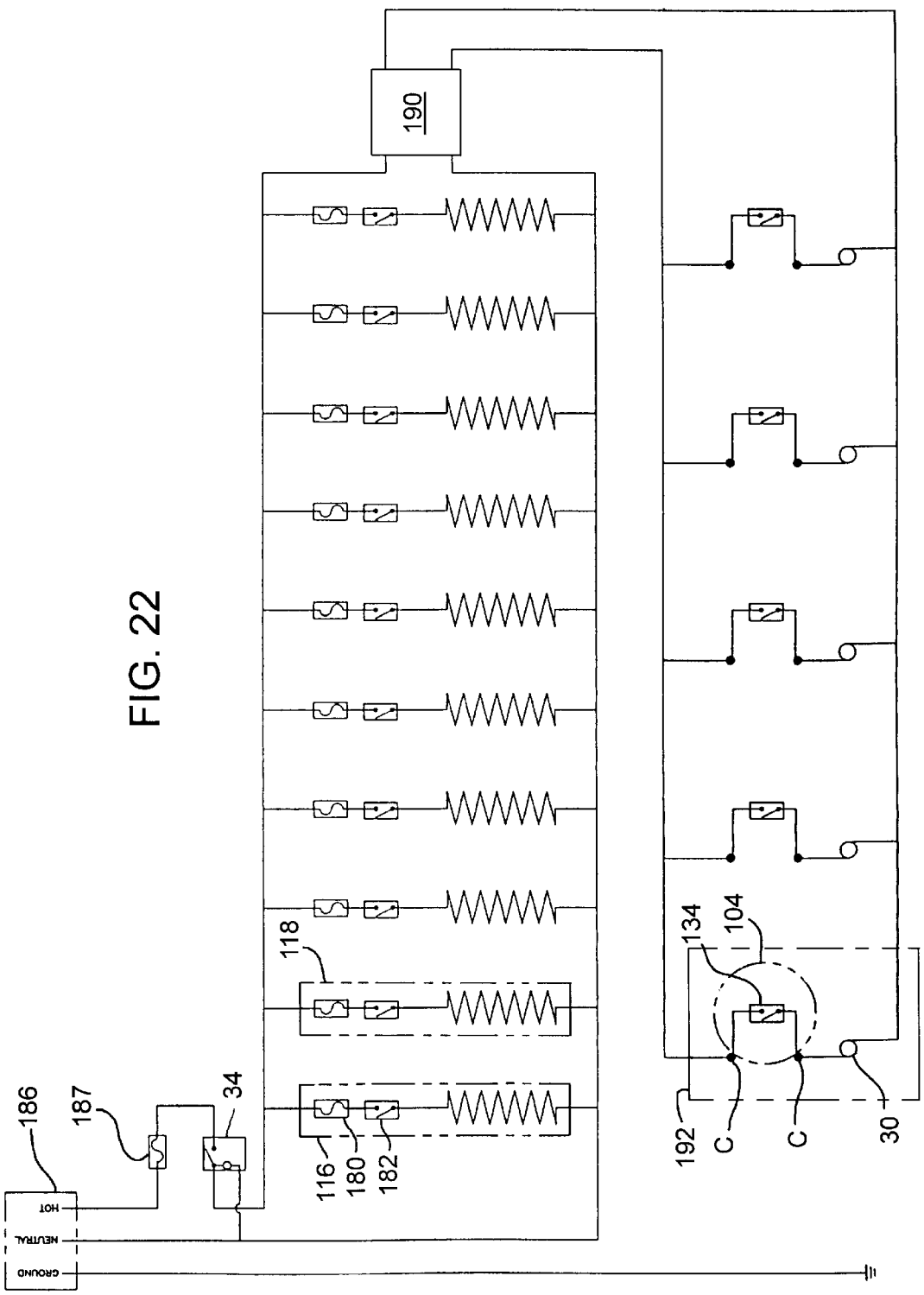
FIG. 22 is a schematic diagram of the invention.

Referring to FIG. 22, the schematic circuit of the invention is shown. AC power is provided through a common, grounded power plug 186, through a 15 amp. fuse 187 to a 15 amp. power switch 34 with a neon lamp. When the power switch is turned on power is supplied to a plurality of oven heating shelves such as lower shelves 116 and upper shelves 118, five pairs of shelves being shown. The shelves are in a parallel circuit, with each shelf having a wax pellet thermo-fuse 180, a bimetal, snap-action thermostat 182 and a resistive heating element 58 in series. The thermostat is normally closed until the desired temperature of approximately 220° F. is reached. All the shelves begin heating when the power switch is turned on. An AC to DC converter 190 is in parallel with the shelves and provides approximately 5 volts direct current at 200 MA to a plurality of lighting circuits 192. Five lighting circuits are shown, one for each pair of oven heating shelves. Each lighting circuit has a thermal switch 134 positioned approximately in the center of the PCM of the pizza warmers 104. The thermal switch is normally open and closes at approximately 95° C. (203° F.). The thermal switch is connected to lighting circuit contacts 110 on the side flats 108 of the warmers. When a pizza warmer is inserted into a charging slot 114, spring contacts 148 extending through the left inner wall 153 and the right inner wall 154 make contact with lighting circuit contacts 110 on each side of the warmer. Contacts C, designate the engagement of a spring contact 148 and a lighting circuit contact 110. The lighting circuit is also connected to a ready light 119 which is a 5 v DC light emitting diode or LED. When the temperature in the pizza warmer reaches the thermal switch's closing temperature, approximately 203° F., the switch closes to complete the lighting circuit, turning on the ready light 119 to indicate that the warmer has been charged and is ready for use.

To operate the pizza warmer and oven system 102, the power switch 34 is turned on, a pizza warmer 104 can be grasped by the warmer's handle 16 and inserted into a charging slot 114. Inserting the warmer causes the upper shelf 118 to be lifted slightly. When the warmer is fully inserted it rests on a lower shelf 116 and the upper shelf will rest on the warmer, maintaining the heating elements 58 in close proximity to the lower and upper surfaces of the warmer. The flats 108 on the sides of the warmers and the guides 144, 146 assure the warmer is properly positioned for the spring contacts 148 to make contact with the lighting circuit contacts 110. Additional warmers can be inserted into empty charging slots as needed. When the power is turned on, the normally closed thermostat in the heating circuits allows the resistance heater in the heating elements 58 to start to heat up. When the temperature of the warmer, detected by the thermal switch 134 in the middle of the PCM layers 124, reaches approximately 203° F. it closes and allows a low DC voltage, provided by an AD to DC converter 190, to light the ready lights 119 indicating the pizza warmer is ready for use. When the thermostat reaches approximately 220° F. the thermostat opens to prevent the warmers from heating further. The thermostat keeps the warmers within an operating range. When needed for use, a charged warmer can be removed and inserted in an insulated container with a pizza or other food item to be kept hot during delivery.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

We claim:

1. A system for keeping multiple food items warm comprising:
    (a) a plurality of heat chargeable food warmers, each for dissipating heat to a food item proximate said each warmer;
    (b) an enclosure;
    (c) a plurality of vertically aligned stations within the enclosure, each station comprising:
        (1) an upper heater supported by the enclosure,
        (2) a lower heater supported by the enclosure, the two heaters defining a slot for insertion of a warmer therebetween, and
        (3) means for closing any gap between the heaters and the warmer between them; and
    (d) an indicator associated with each station for notifying a user whenever a warmer in said each station is charged.

2. The system according to claim 1 wherein one of the heaters of said each station is fixed in relation to the enclosure, and the other heater of said each station is movable vertically over a range, and further comprising, for said each station, a bias urging the movable heater against a warmer in the station until the warmer abuts the fixed heater.

3. The system according to claim 2 wherein the lower heater is fixed in relation to the enclosure, and the upper heater is movable vertically over a range, and wherein the bias for urging comprises gravity acting against the weight of the upper heater.

4. A system for keeping multiple food items warm comprising:
  (a) a plurality of heat chargeable food warmers, each for dissipating heat to a food item proximate said each warmer, each warmer comprising:
    (1) an outer shell defining an internal cavity,
    (2) phase change material chargeable by the heat source disposed within the cavity, and
    (3) two opposite, planar faces of the shell for ingress and egress of heat energy;
  (b) an enclosure;
  (c) a plurality of vertically aligned stations within the enclosure, each station comprising:
    (1) an upper heater supported by the enclosure,
    (2) a lower heater supported by the enclosure, the two heaters defining a slot for insertion of a warmer therebetween, and
    (3) means for closing any gap between the heaters and the warmer between them; and
  (d) an indicator associated with each station for notifying a user whenever a warmer in the station is charged.

5. The system according to claim 4 wherein one of the heaters of each station is fixed in relation to the enclosure, and the other heater of each station is movable vertically over a range, and further comprising, for each station, a bias urging the movable heater against a warmer in the station until the warmer abuts the fixed heater.

6. The system according to claim 5 wherein the upper heater is fixed in relation to the enclosure, and the lower heater is movable vertically over a range, and wherein the bias for urging comprises:
  (a) a lever, and
  (b) means for elevating the lower heaters of each station in response to movement of the lever.

7. The system according to claim 5 wherein the lower heater is fixed in relation to the enclosure, and the upper heater is movable vertically over a range, and wherein the bias for urging comprises gravity acting against the weight of the upper heater.

8. The system according to claim 4 further comprising:
  (a) for each station, an indicator which when energized is indicative that a warmer in said each station is charged and a circuit, responsive to an enabling signal, for energizing the indicator; and
  (b) for each warmer, a temperature sensor for producing an enabling signal whenever the temperature of the phase change material in said each warmer reaches or exceeds a preselected temperature.

9. The system according to claim 8 wherein the temperature sensor for each warmer comprises a thermally actuated switch in thermal communication with the phase change material of said each warmer, the actuation of the switch producing the enabling signal.

10. The system according to claim 8 further comprising:
  (a) a plurality of external contacts peripherally disposed on said each warmer, the contacts being in signal communication with said each warmer's temperature sensor;
  (b) a plurality of mating contacts disposed at said each station for signal communication with said each warmer's external contacts whenever said each warmer is disposed within the station, the mating contacts also being in communication with said each station's indicator energizing circuit.

11. The system according to claim 8 wherein the switch is disposed within the phase change material.

* * * * *